United States Patent
Irmer

(10) Patent No.: US 6,732,045 B1
(45) Date of Patent: May 4, 2004

(54) METHOD AND DEVICE FOR DETECTING THE POSITION OF A VEHICLE IN A GIVEN AREA

(75) Inventor: Jochen Irmer, Munich (DE)

(73) Assignee: Locanis Technologies GmbH, Unterfohring (DE)

(*) Notice: Subject to any disclaimer, the term of this patent is extended or adjusted under 35 U.S.C. 154(b) by 23 days.

(21) Appl. No.: 10/049,487

(22) PCT Filed: Jul. 20, 2000

(86) PCT No.: PCT/EP00/06951
§ 371 (c)(1),
(2), (4) Date: May 13, 2002

(87) PCT Pub. No.: WO01/13192
PCT Pub. Date: Feb. 22, 2001

(30) Foreign Application Priority Data

Aug. 13, 1999 (DE) .................................. 199 38 345

(51) Int. Cl.$^7$ .................................................. C06F 7/00
(52) U.S. Cl. ...................................... 701/207; 340/988
(58) Field of Search ............................. 701/207, 200, 701/36; 73/178 R; 340/988

(56) References Cited

U.S. PATENT DOCUMENTS

| 4,817,000 A | 3/1989 | Eberhardt ..................... 364/443 |
| 5,508,917 A | 4/1996 | Siegle et al. ................. 364/424 |

FOREIGN PATENT DOCUMENTS

| DE | 34 90 712 C2 | 9/1986 | ............ G05D/1/02 |
| DE | 35 38 908 A1 | 5/1987 | ............ G05D/1/02 |
| DE | 40 39 887 A1 | 6/1992 | ............ G06F/15/50 |
| DE | 44 29 016 A1 | 2/1996 | ............ G01C/21/00 |
| EP | 0 185 816 | 7/1986 | ............ G05D/1/03 |
| GB | 2158965 A | 11/1985 | ............ G05D/1/02 |

Primary Examiner—William A. Cuchlinski, Jr.
Assistant Examiner—Olga Hernandez
(74) Attorney, Agent, or Firm—Myers Bigel Sibley & Sajovec

(57) ABSTRACT

A method for detecting the position of a vehicle in a predetermined area includes: detecting the magnitude and the angle of incremental motion vectors relating to the movement of the vehicle by means of a first sensor device; automatically fixing the vehicle at predetermined points within the predetermined area whenever the vehicle passes a corresponding point; and detecting the current position of the vehicle in the predetermined area by vectorial summation of the detected incremental motion vectors with respect to the position vector to the current reference position. The automatic fixing of a respective reference position of the vehicle at predetermined points is carried out by means of a second sensor device, which interacts in a non-contacting manner with a respective reference marking at the corresponding point within the predetermined area. The respective reference marking has reflective and non-reflective areas which the second sensor device simultaneously scans by means of at least two signals, with the coordinates of the reference position of the vehicle relative to a reference position of the reference marking and, optionally, the through-movement angle being determined by evaluating the time profile of the reflected intensity of the signals.

12 Claims, 4 Drawing Sheets

METHOD AND DEVICE FOR DETECTING
THE POSITION OF A VEHICLE IN A GIVEN
AREA

CROSS-REFERENCE TO RELATED APPLICATIONS

The present application claims priority under 35 U.S.C. §371 from PCT Application No. PCT/EP00/06951, filed on Jul. 20, 2000, which claims the benefit of German Application Serial No. 19938345.6, filed on Aug. 13, 1999, the disclosures of which are incorporated by reference herein in their entireties.

1. Field of the Invention

The present invention relates to a method and apparatus for detecting the position of a vehicle in a predetermined area, in particular a storage facility, and to a store management method and system.

2. Background of the Invention

DE 4429016 A1 discloses an apparatus and a method for navigation of driverless vehicles. In this case, the magnitude and angle of incremental movements from the motion of the vehicle are detected by means of an integrated navigation apparatus. Furthermore, a respective reference position of the vehicle is fixed automatically at predetermined points within a pre-determined area by means of a CCD camera whenever the vehicle passes an appropriate point. Furthermore, the current position of the vehicle in the predetermined area is detected by vectorial summation of the detected incremental motion vectors by means of an evaluation unit, to form the position vector related to the current reference position. The position and orientation identification described there are disadvantageously derived from a very expensive CCD camera and a high-contrast lighting means in the form of a ceiling lamp. Failure of the lamp leads to loss of position.

DE 3490712 C2 discloses a vehicle control and management system with a movement drive device for driving the vehicle, a steering device for controlling the route of the vehicle, an integrated navigation device for calculating the position of the vehicle track on an incremental basis, a device for saving a desired route for the vehicle, a device for controlling the vehicle drive and steering device in order to drive the vehicle along the desired route, and a device for saving the position of one or more fixed-position reference destinations.

DE 3538908 A1 discloses an autonomous on-board position-finding system for position determination and collision protection fox robot vehicles and industrial trucks, based on the integrated navigation method, on predetermined routes. The current width and length are determined continuously, by means of an addition circuit, using at least one distance sensor within the system. These sensor values are processed in such a way that a control signal is produced to guide the vehicle safely along the center of the route.

DE 4039887 A1 discloses a further known vehicle management and destination routing system.

Although it can be applied to any desired vehicles and areas, the present invention, as well as the problems on which it is based, will be explained with respect to two forklift trucks in a storage facility, as components of a store management system.

A store management system monitors, controls, documents and analyses the movement of goods in a storage depot. Transport vehicles, such as forklift trucks, are normally used for moving the goods.

Important factors which reflect the quality of such a system are the access times, the acquisition times and the accuracy with which storage locations are determined.

By way of example, one known system uses fixed predetermined routes for transportation vehicles, for example on rails, and position sensors installed on them.

The above known approach has been found to have the disadvantage that only predetermined routes can be used, and installation and retrofitting involve a need for complex changes to the system.

A system with non-contacting position detection, such as the known GPS system (Global Positioning system) would be more expedient. The positions which occur in the storage areas and which need to be classified are, however, in the range of centimeters or less (for example in the region of 40 cm for European standard pallets). Such high position resolution cannot be achieved, however, with the known differential GPS system whose resolution capability is typically only about 1 m. Furthermore, the GPS system cannot be used within closed rooms, owing to the shielding effects.

One object of the present invention is thus to provide a method and apparatus for detecting the position of a vehicle in a predetermined area, in particular a storage facility, which allows more accurate and more reliable position findings, and which requires only minor changes to the area, or the storage areas. A further object is to provide a storage management method and system.

SUMMARY OF THE INVENTION

The method according to the invention and having the features of claim 1, as well as the corresponding apparatus as claimed in claim 6, have, in contrast to the known solution approach, the advantage that they allow highly accurate and reliable position finding, and require little in the way of changes to the existing area or storage areas. Retrofitting is thus feasible without any problems, in addition to initial equipment.

The idea on which the present invention is based is to automatically fix a respective reference position of the respective vehicle at predetermined points within the predetermined area whenever the vehicle passes a corresponding point. The automatic fixing of a respective reference position of the vehicle at the predetermined points is carried out by means of a second sensor device, which is fitted to the vehicle and interacts, in a non-contacting manner, with a respective reference marking at the corresponding point within he predetermined area. The Respective reference marking has reflective and non-reflective areas, which the vehicle scans simultaneously by means of two signals, with the coordinates of the reference position and, optionally, the through-movement angle being determined by evaluating the tire profile of the reflected intensity of the signals.

The dependent claims relate to advantageous developments and improvements of the respective subject matter of the invention.

According to one preferred development, the signal carriers are light beams, preferably laser beams, or magnetic induction lines of force.

According to a further preferred embodiment, the respective reference marking has a rectangular strip, which has two reflective areas and one non-reflective area along the rectangle diagonals, under which the vehicle moves. This reference marking advantageously allows an analytical solution for determination of the coordinates of the reference position and of the two-movement angle by evaluating the time profile of e reflected intensity of the signals.

According to a further preferred development the magnitude and the angle of incremental motion vectors relating to the movement of the vehicle are detected by means of a first sensor device, which is fitted to the vehicle. This preferably comprises a gyrator for angle determination and an encoder for length determination.

According to a further preferred development, the automatic fixing of a respective reference position of the vehicle is carried out such that the statistical discrepancy between the detected current position and the actual position does not exceed a predetermined limit value.

BRIEF DESCRIPTION OF THE DRAWINGS

Exemplary embodiments of the invention will be explained in more detail in the following description, and are illustrated in the drawings, in which.

DETAILED DESCRIPTION OF THE PREFERRED EMBODIMENTS

Figure 1:
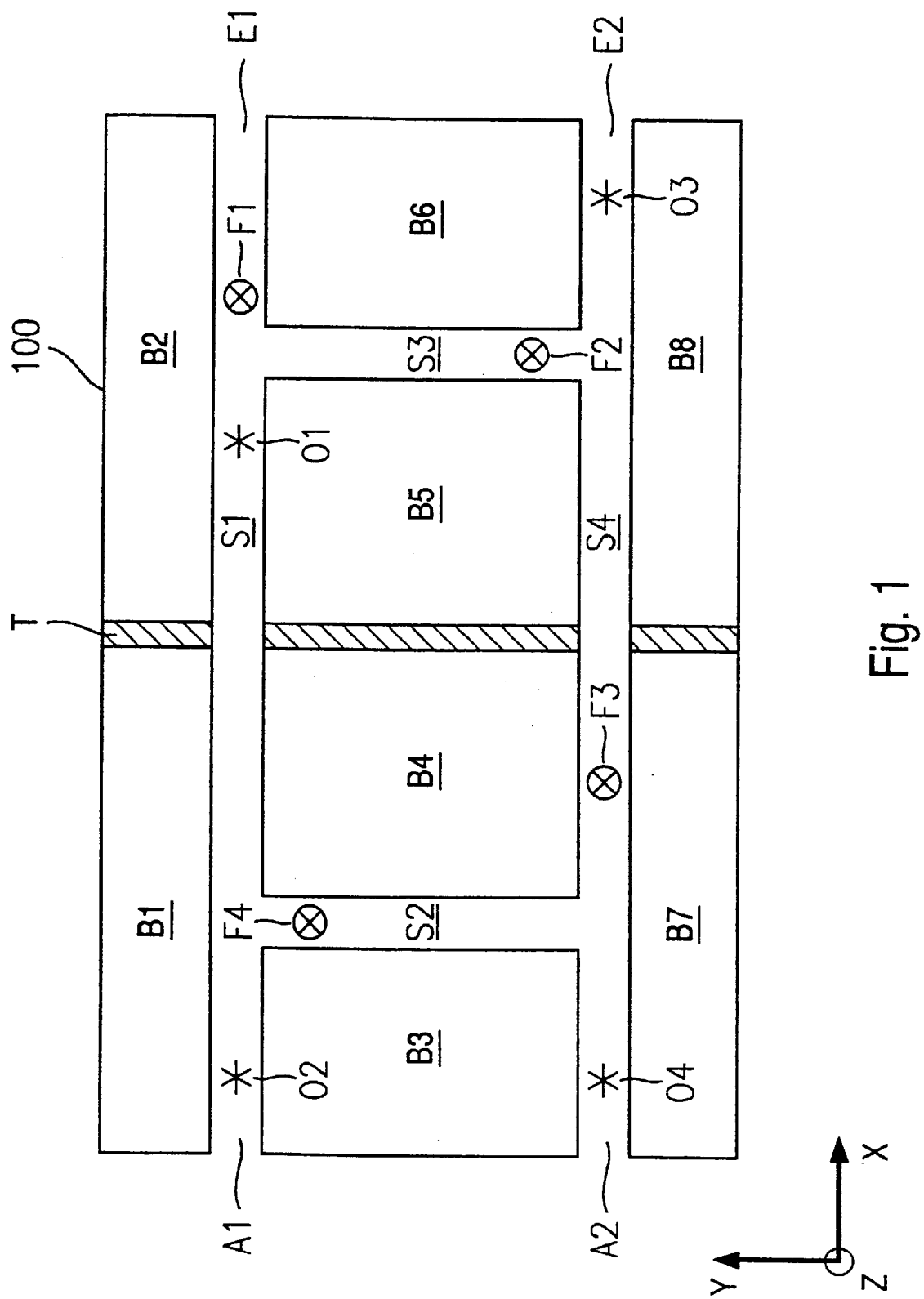
FIG. 1 shows a schematic illustration of a storage facility, in which one embodiment of the apparatus according to the invention can be used.

In the figures, identical reference symbols denote identical or functionally identical Components FIG. 1 shows a schematic illustration of a storage facility, in which one embodiment of the apparatus according to the invention can be used.

In FIG. 1, 100 denotes a predetermined area in the form of a storage facility, B1–B8 denote storage area elements, T denotes a separating wall, E1 and E2 denote delivery inputs, A1 and A2 denote dispatch outputs, S1–S4 denote store routes, F1–F4 denote vehicles in the form of forklift trucks, and, O1–O4 denote reference points with measurement strips.

The forklift trucks F1–F4 are equipped with graphics terminals, which are not illustrated but are compatible with radio networks. These communicate, for example via a serial interface, with a position transmitter, which is likewise not illustrated. This uses the transmitted sensor data to fix the precise position of the respective forklift truck F1–F4 in the store, and transmits, this to the forklift truck terminal. In addition to this position data, the terminal indicates the forklift truck driver loading jobs intended for him, All forklift truck drivers can also use suitable, masks and menus to make manual inputs, such as recording of goods for which there is zero stock, load corrections and lifting operation errors, following the presence message.

Each forklift truck F1–F4 has a pressure and strain gauge sensor system (DMS sensor system) on the forks of the trucks, by means of which it is possible to determine whether the relevant forklift truck F1–F4 is or is not currently transporting any goods, and to determine the respective number of items in the stack.

All the forklift truck terminals interact either independently (online mode) or with a time offset (offline node) with the stationary central computer. The online mode is the normal situation. If all the forklift truck terminals have beer operated offline, then, once they return to the online mode, the goods movements which have been carried out in the offline mode must be synchronized before returning to the online mode, in order to update the stocks in the database of the stationary central computer.

Typical functions in such a store management system are, by way of example:

storage of goods delivered from production or from a supplier;

removal of goods which have been stored;

finding specific goods which have been stored;

relocation of goods which have been stored;

production of inventory of all the goods that have been stored.

Figure 2:
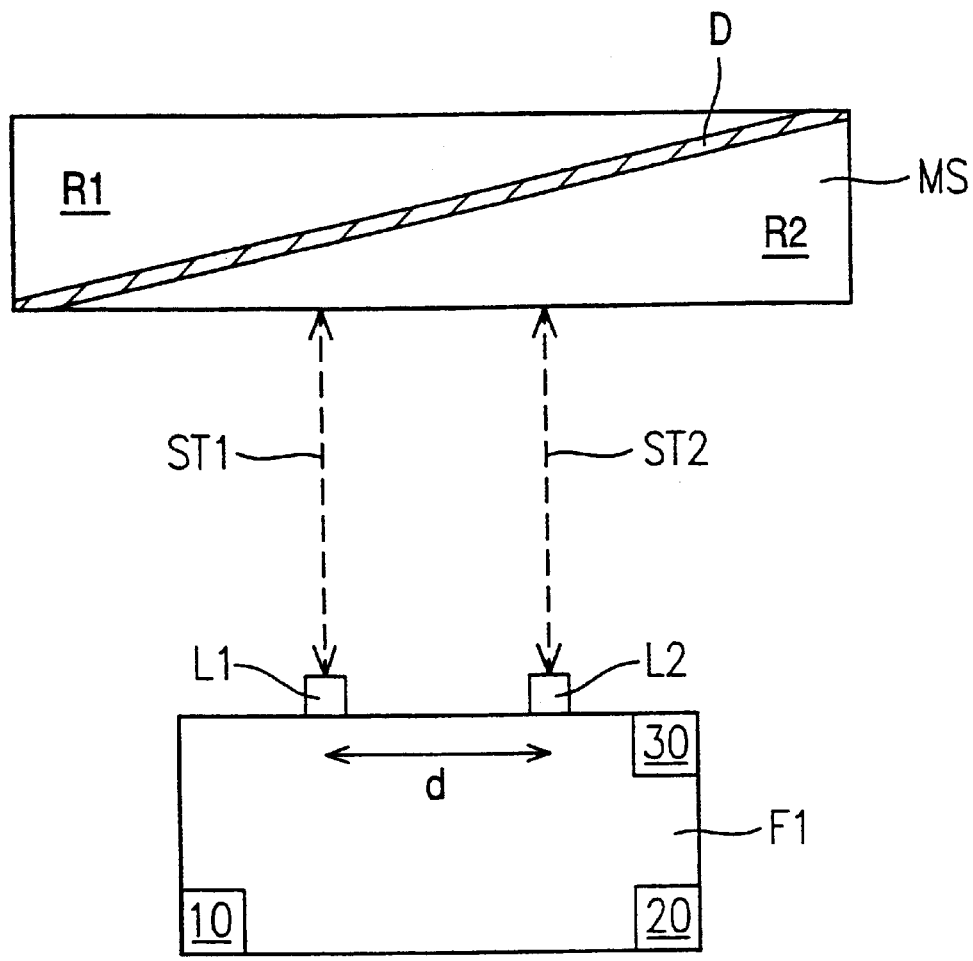
FIG. 2 shows an illustration of a measurement strip and of a vehicle according to the embodiment of the apparatus according to the invention shown in FIG. 1.

FIG. 2 shows are illustration of a measurement strip and of a vehicle, corresponding to the embodiment of the apparatus according to the invention shown in FIG. 1.

In FIG. 2, MS denotes measurement strips which are fitted at the points O1–O4 on the ceiling of the storage facility as shown in FIG. 1, D denotes a non-reflective diagonal area, R1 and R2 denote reflective area elements, L1, and L2 denote a first and second laser device, respectively, ST1 and ST2 denote a first and a second laser beam, respectively, 10 denotes a first sensor device, 20 denotes a microcomputer, and 30 denotes a transmitting/receiving unit.

The following text uses the example of the forklift truck F1 to explain in more detail how, in this embodiment of the invention, the position of each of the forklift trucks F1–F4 is determined continuously in the storage facility 100.

The first sensor device 10 in the forklift truck F1 contains a rotating sensor system on a gyrator basis, and a translational sensor system on an encoder basis.

In this example, the gyrator has a resolution of 0.1° and is a piezoelectric gyro, whose measurement principle corresponds to that of a Focault pendulum, which means that it makes use of the Coriolis force. Specifically, this Coriolis force acts at right angles to a body that is vibrating linearly. The force is proportional to the angular velocity, and the desired angle can be obtained by appropriate integration.

In this example, the encoder has a resolution in the centrimetric range, typically 30–40 cm in about 500 m, and is, for example, an inductive transmitter, which scans the wheel hub. If selected appropriately, it can detect both forward and reverse movements and corrections can be expediently carried out for a different wheel circumference.

The positioning accuracy which can be achieved in this way, provided there is no slip, the wheel diameter is constant, and with a resolution of 48 pulses per resolution is ±4.8 cm, with an angular offset of 17.4 cm, over a straight line movement of 100 m.

This sensor device 10 thus allows continuous detection of the magnitude and of the angle of incremental motion vectors relating to the movement of the vehicle F1. Thus, in principle, once a reference point has been fixed, the current location of the forklift truck F1 can be represented as a vector, which is a vector sum of the incremental motion vectors detected by the sensor device 10. However, this results in a problem, in that the accuracy of the current location relative to the reference point decreases as the number of detected incremental motion vectors increases, since each detection incremental motion vector is subject to a finite detection error.

Thus, in this embodiment of tie invention, the reference position of the vehicle C1 is automatically fixed (once again) at the predetermined points O1–O4 within the storage facility 100 wherever the vehicle F1 passes a corresponding point O1–O4. The points O1–O4 are chosen such that the probability of a respective vehicle passing them is high.

The current position of the vehicle F1 in the predetermined area 100 is thus detected by a vectorial addition of the detected incremental motion vectors with respect to the position vector of the current reference position, and this is refreshed automatically, continuously. This makes it possible to avoid the problem of decreasing position finding accuracy, so that high-accuracy position data is always obtained, typically in the centrimetric range.

Figure 3:
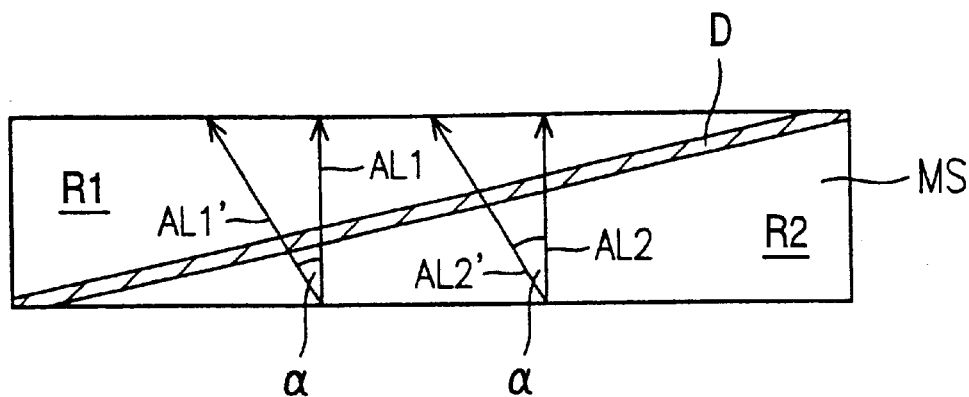
FIG. 3 shows an illustration of a measurement strip in order to explain the automatic fixing of a respective reference position of the vehicle.

As can be seen from FIG. 3, the respective reference marking or the reference strip MS is a rectangular strip, typically with a width of 10 cm and a length of 500 cm, which has two reflective areas R1, R2 and a non-reflective area D along the rectangle diagonals.

The measurement strip MS is fitted t the points O1–O4 such that the vehicle F1 moves past underneath them and, at the same time, the strip is scanned by means of the two laser bears ST1, ST2, which are at a main distance d from one another. In this case, the coordinates of the reference position are determined by evaluating the time profile of the intensity of the laser beams ST1, ST2 reflected from the respective measurement strip MS.

Figure 4:
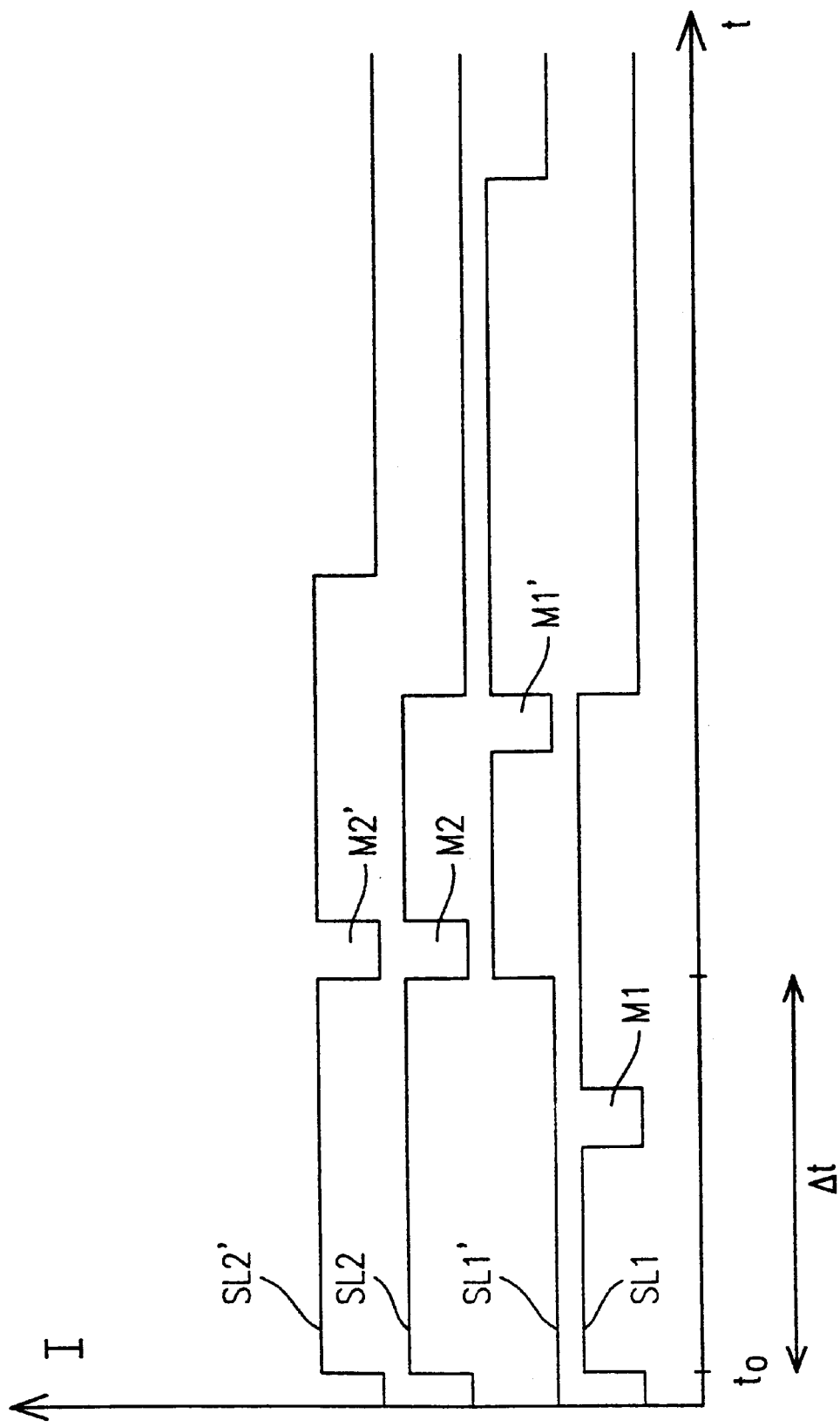
FIG. 4 shows an illustration of laser signals, which are reflected from the measurement strip, as a function of time for two different through-movement angles.

FIG. 3 shows an illustration of a measurement strip in order to explain the automatic fixing of a respective reference position of the vehicle, and FIG. 4 shows an illustration of laser signals, which are reflected from the measurement strip, as a function of time for two different through-movement angles.

In FIGS. 3 and 4, AL1, AL2 and ALI', AL2' denote scanning paths of the laser beams ST1 and ST2 on the measurement strip ST, γ denotes an angle, t denotes the time, Δt denotes a time difference, SL1, SL2 and SL1', SL2' denotes signal profiles of the reflected intensity for the laser beams ST1 and ST2, M1, M2 and M1', M2' denote minima in the signal profiles of the reflected intensity for ST1 and ST2, and $t_0$ denotes a reference time.

On the assumption that the forklift truck F1 moves under the measurement strip MS at right angles top the longitudinal direction of the latter ($\alpha=0°$), the scanning paths of the laser beams ST1 and ST2 are the paths denoted by AL1, AL2. The corresponding signal profiles of the reflected intensity for the laser beams ST1 and ST2 are SL1 and SL2 in FIG. 4. As can be seen, in this case there is no phase shift and no time difference Δt between SL1 and SL2.

On the assumption that the forklift truck F1 does not pass under the measurement strip MS at right angles to the longitudinal direction of the latter (that is to say α is not 0°), the scanning paths of the laser beams ST1 and ST2 will be the paths AL1', AL2'. The corresponding signal profiles of the reflected intensity for the laser beams ST1 ad ST2 are SL1' and SL2' in FIG. 4. As can be seen, in this case, there is a phase shift or a time difference Δt between SL1' and SL2'.

Figure 5:
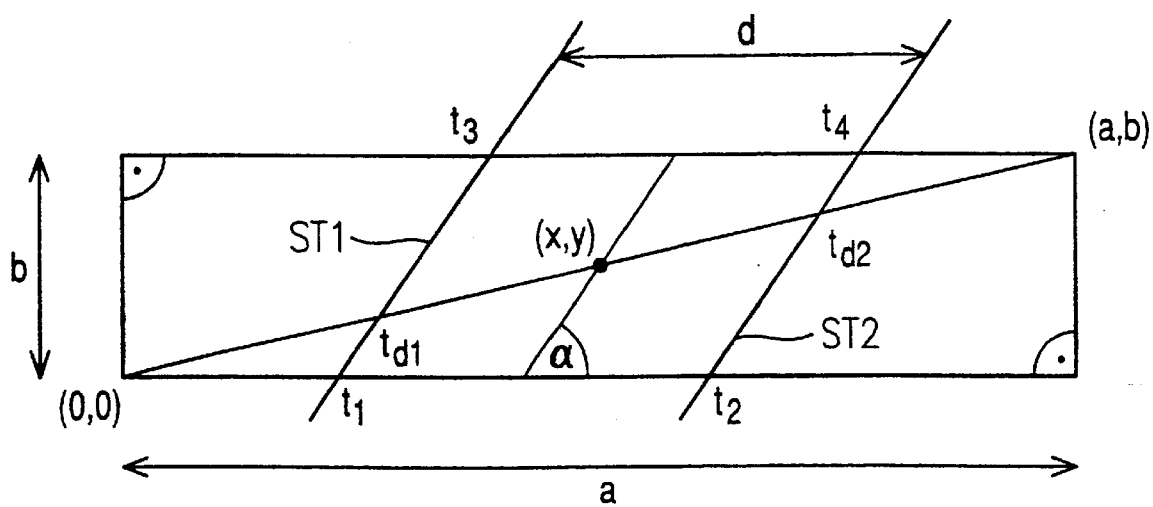
FIG. 5 shows an illustration of a measurement strip in order to explain the process of determining x, y and α.

FIG. 5 shows an illustration of a measurement strip in order to explain the process of determining x, y and α. The x coordinate of the reference point is determined from the measured times $t_1, t_2, t_3, t_4, t_{d1}$ and $t_{d2}$ in the signal profiles SL1 and SL2, as well as is the strip geometry a, b, d, in accordance with the following equation:

$$\chi = \frac{a(2t1 + 2t2 - td1 - td2)}{t1 + t2 - t3 - t4} \quad (1)$$

The y-coordinate is obtained from:

$$y = \frac{b(-2t1 + td1 - td2)}{2(-t1 + t3)} \quad (2)$$

The angle α can be obtained from:

$$\alpha = \arccos \frac{b(-t1 + t2 - t3 + t4)}{d(-t1 - t2 + t3 + t4)} \quad (3)$$

A typical store management operation will be described in the following text with reference to a simple example.

The forklift trucks F1–F4 first of all register with the central computer via their transmitting/receiving unit 30. The driver is then requested to drive to a first measurement strip or to enter his current position as the first reference position directly at the terminal. The central computer then continues to calculate the current position on the basis of the transmitted measurement data from the first central device 10, and transmission of the calculated current position at the respective forklift trucks F1–F4. Let us now assume that a job occurs which involves collecting an item at the delivery input E1 and storing it at a free store position in the store area element B7 at the dispatch output A2.

The forklift truck F1 is selected to do this by central computer, since it is the closest to the delivery input E1. The forklift truck F1 thus moves to the delivery input E1 and picks up the item on its forks, with this being detected by the corresponding strain gauge sensor. At the same time, the fact that the item has been picked up is signaled to the central computer via the transmitting/receiving unit, and is registered there. The forklift truck F1 then moves along the store route S1 in the direction of the Dispatch output A1, with its position with respect to the first reference point being detected all the time. When it passes the point O1, the laser beams S1, 52 interact with the measurement strip MS located there, and a new reference point is defined by the central computer, in accordance with the method described above. After this time, the position is detected with reference to the new reference point.

At the crossing with the store route S2, the forklift truck F1 turns left and drives to the store route S4, where it turns right to reach the point O4. On passing the point 04, the laser beams S1, S2 interact with the measurement strip MS located there, and a new reference point is once again defined by the central computer in accordance with the method described above. From this time, the position is detected with reference to the new reference point.

Finally, the forklift truck F1 reaches the storage point, which is immediately in front of the dispatch output A2. The item is stored at the intended point there, and this is signaled to the central computer. The latter saves the store operation, including the accurate storage point coordinates.

Thus, in principle, any store operation can be saved and recorded accurately.

Although the present invention has been described above on the basis of one preferred exemplary embodiment, it is not restricted to this, but can be modified in a large number of ways.

Even though, according to the above example, the position calculation was carried out in the central computer on the basis of the transmitted sensor data, this calculation can also be carried out in the microcomputer in the vehicle.

The invention is also not restricted to store vehicles, but can also be generalized to any desired restricted areas.

Furthermore, the fixing of the reference points can be carried out not only by means of the described laser system, but by using any desired non-contacting position sensors which scan the reference marking with at least two signals, for example inductive transmitters, light barriers, etc. Furthermore, more than two signals can also be used for scanning purposes in this case.

In addition, the reference marking is not restricted to the rectangular strip as described, which has two reflective areas and one non-reflective area along the rectangle diagonals, under which the vehicle moves. In fact, a number of such strips may se placed alongside one another, in order to form an overall strip which is composed of a number of segments, which each have two reflective areas and one non-reflective area along the rectangle diagonals. This is particularly advantageous when the reference marking exceeds a specific width since, in this case, the straight-line gradings of the non-reflective area falls along the rectangle diagonals, so that the resolution accuracy also decreases.

In the above example of the reference marking in the form of the rectangular strip which has two reflective areas and one non-reflective area along the rectangle diagonals, an analytical solution is advantageously possible for determining the coordinates of the reference position and of the through-movement angle, by evaluating the time profile of the reflected intensity of the signals.

However, other strip geometries are, of course, also feasible, with, for example, only a numerical solution being possible for determining the coordinates of the reference position and the through-movement angle by evaluating the time profiles of the reflected intensity of the signals, or a considerably more complex analytical solution also being possible.

ISOCOM Automationssysteme, 81379 Munch

Method and apparatus for detecting the position of a vehicle in a predetermined area, in particular a storage facility, as well as a store management method and system

LIST OF REFERENCE SYMBOLS

| | |
|---|---|
| 100 | Predetermined area, storage facility |
| B1–B8 | Storage area elements |
| T | Separating wall |
| E1, E2 | Delivery inputs |
| A1, A2 | Dispatch outputs |
| S1–S4 | Store routes |
| F1–F4 | Vehicles |
| O1–O4 | Reference points with measurement strips |
| MS | Measurement strip |
| D | Non-reflective diagonal area |
| R1, R2 | Reflective area elements |
| L1, L2 | First, second laser device |
| ST1, ST2 | First, second laser beam |
| 10 | First sensor device |
| 20 | Microcomputer |
| 30 | Transmitting/receiving unit |
| λ | Angle |
| AL1, AL2; AL1', AL2' | Scanning of ST1 and ST2 |
| t | Time |
| Δt | Time difference |
| SL1, SL2;, SL1', SL2' | Signal profiles of the reflected intensity for ST1 and ST2 |
| M1, M2; M1', M2' | Minima in the signal profiles of the reflected intensity for ST1 and ST2 as appropriate |
| $t_0$ | Reference time |

What is claimed is:

1. A method for detecting the position of a vehicle in a predetermined area, said method comprising:

detecting the magnitude and the angle of incremental motion vectors relating to the movement of the vehicle by means of a first sensor device;

automatically fixing the vehicle at predetermined points within the predetermined area whenever the vehicle passes a corresponding point; and detecting the current position of the vehicle in the predetermined area by vectorial summation of the detected incremental motion vectors with respect to the position vector to the current reference position;

wherein the automatic fixing of a respective reference position of the vehicle at predetermined points is carried out by means of a second sensor device, which interacts in a non-contacting manner with a respective reference marking at the corresponding point within the predetermined area; and wherein the respective reference marking has reflective and non-reflective areas which the second sensor device simultaneously scans by means of at least two signals, with the coordinates of the reference position of the vehicle relative to a reference position of the reference marking and, optionally, the through-movement angle being determined by evaluating the time profile of the reflected intensity of the signals.

2. The method of claim 1 wherein the signal carriers are light beams or magnetic induction lines of force.

3. The method of claim 1 wherein the respective reference marking has a rectangular strip, which has two reflective areas and one non-reflective area along the rectangle diagonals, under which the vehicle moves.

4. The method of claim 1 wherein at least one of the first and second sensor devices is fitted to the vehicle.

5. The method of claim 1 wherein the automatic fixing of a respective reference position of the vehicle is carried out frequently such that the statistical discrepancy between the detected current position and the actual position does not exceed a predetermined limit value.

6. An apparatus for detecting the position of a vehicle in a predetermined area, the apparatus comprising:

a first sensor device for detecting the magnitude and the angle of incremental motion vectors relating to the movement of the vehicle;

a fixing device for automatically fixing a respective reference position of the vehicle at predetermined points within the predetermined area whenever the vehicle passes a corresponding point; and a detection device for detecting the current position of the vehicle in the predetermined area by vectorial addition of the detected incremental motion vectors with respect to the position vector of the current reference position;

wherein the fixing device has a second sensor device which interacts in a non-contacting manner with a reference marking at the respective corresponding point within the predetermined area;

wherein the respective reference marking has reflective and non-reflective areas; and wherein the second sensor device is designed such that it can scan the respective reference marking simultaneously by means of two signals in which case the coordinates of the reference position of the vehicle relative to a reference position of the reference marking and, optionally, the through-movement angle can be determined by evaluating the time profile of the reflected intensity of the signals.

7. The apparatus of claim 6 wherein the signal carriers are light beams or magnetic induction lines of force.

8. The apparatus of claim 6 wherein the respective reference marking has a rectangular strip, which has two reflective areas and one non-reflective area along the rectangle diagonals, under which the vehicle moves.

9. The apparatus of claim 6 wherein the first sensor device is fitted to the vehicle.

10. The apparatus of claim 6 wherein the fixing device is designed such that the automatic fixing of a respective reference position of the vehicle is carried out frequently such that the statistical discrepancy between the detected current position and the actual position is not greater than a predetermined limit value.

11. A store management method comprising:

providing a storage facility and a number of store vehicles for carrying out at least one of storage, relocation and removal procedures for goods, the storage facility having a predetermined area;

detecting the magnitude and the angle of incremental motion vectors relating to the movement of the vehicle by means of a first sensor device;

automatically fixing the vehicle at predetermined points within the predetermined area whenever the vehicle passes a corresponding point;

detecting the current position of the vehicle in the predetermined area by vectorial summation of the detected incremental motion vectors with respect to the position vector to the current reference position; and saving at least one of the following parameters for the at least one of storage, relocation and removal procedures: store position, time of storage, time of relocation, time of removal, type of goods, and storage duration;

wherein the automatic fixing of a respective reference position of the vehicle at predetermined points is carried out by means of a second sensor device, which interacts in a non-contacting manner with a respective reference marking at the corresponding point within the predetermined area; and wherein the respective reference marking has reflective and non-reflective areas which the second sensor device simultaneously scans by means of at least two signals, with the coordinates of the reference position of the vehicle relative to a reference position of the reference marking and, optionally, the through-movement angle being determined by evaluating the time profile of the reflected intensity of the signals.

12. A store management system comprising:

a storage facility and a number of store vehicles for carrying out at least one of storage, relocation, and removal procedures for goods, the storage facility having a predetermined area; and a first sensor device for detecting the magnitude and the angle of incremental motion vectors relating to the movement of the vehicle;

a fixing device for automatically fixing a respective reference position of the vehicle at predetermined points within the predetermined area whenever the vehicle passes a corresponding point;

a detection device for detecting the current position of the vehicle in the predetermined area by vectorial addition of the detected incremental motion vectors with respect to the position vector of the current reference position; and a memory device for saving at least one of the following parameters relating to the at least one of storage, relocation, and removal procedures: store position, time of storage, time of relocation, time of removal, type of goods, and storage duration;

wherein the fixing device has a second sensor device which interacts in a non-contacting manner with a reference marking at the respective corresponding point within the predetermined area;

wherein the respective reference marking has reflective and non-reflective areas; and wherein the second sensor device is designed such that it can scan the respective reference marking simultaneously by means of two signals in which case the coordinates of the reference position of the vehicle relative to a reference position of the reference marking and, optionally, the through-movement angle can be determined by evaluating the time profile of the reflected intensity of the signals.

* * * * *